G. CANNISTRA.
HYDROAEROPLANE.
APPLICATION FILED FEB. 21, 1917.
1,332,602.
Patented Mar. 2, 1920.
3 SHEETS—SHEET 1.
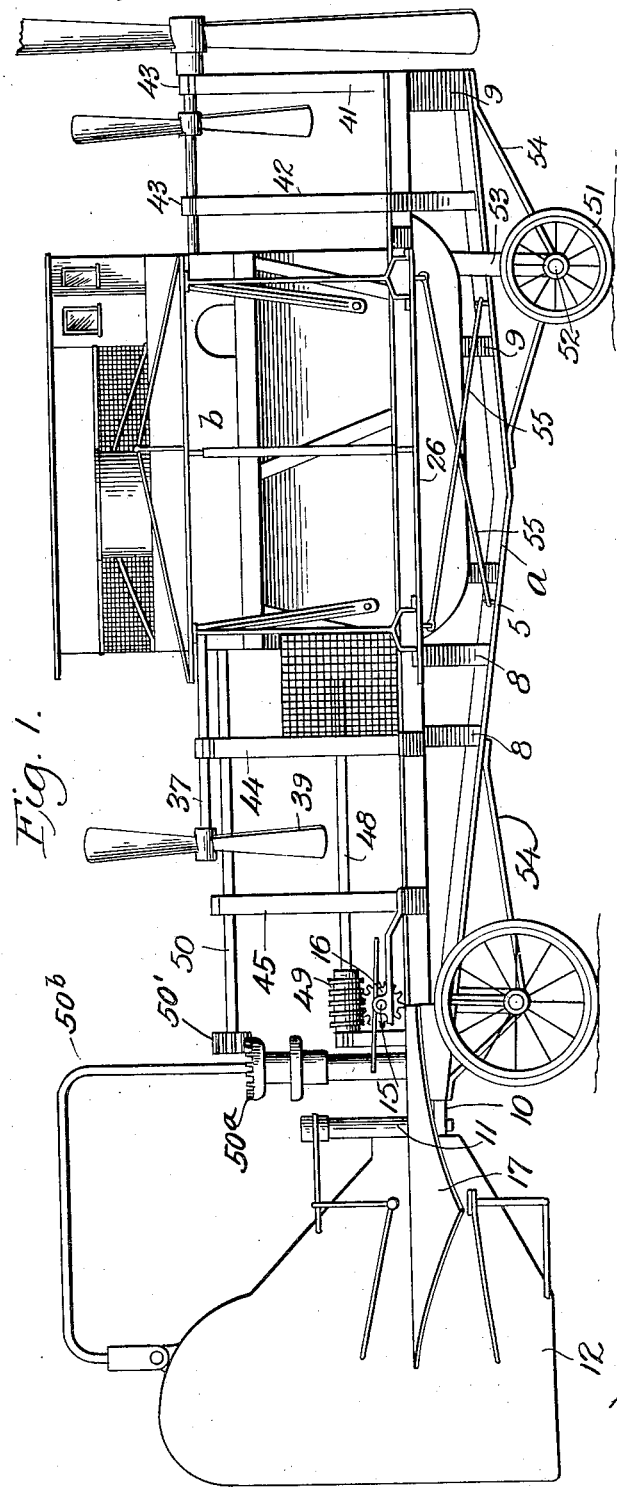
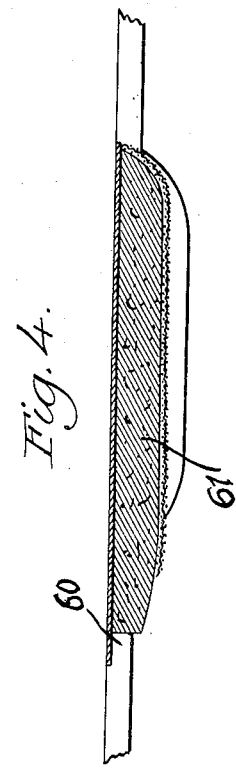

G. CANNISTRA.
HYDROAEROPLANE.
APPLICATION FILED FEB. 21, 1917.
1,332,602.
Patented Mar. 2, 1920.
3 SHEETS—SHEET 2.
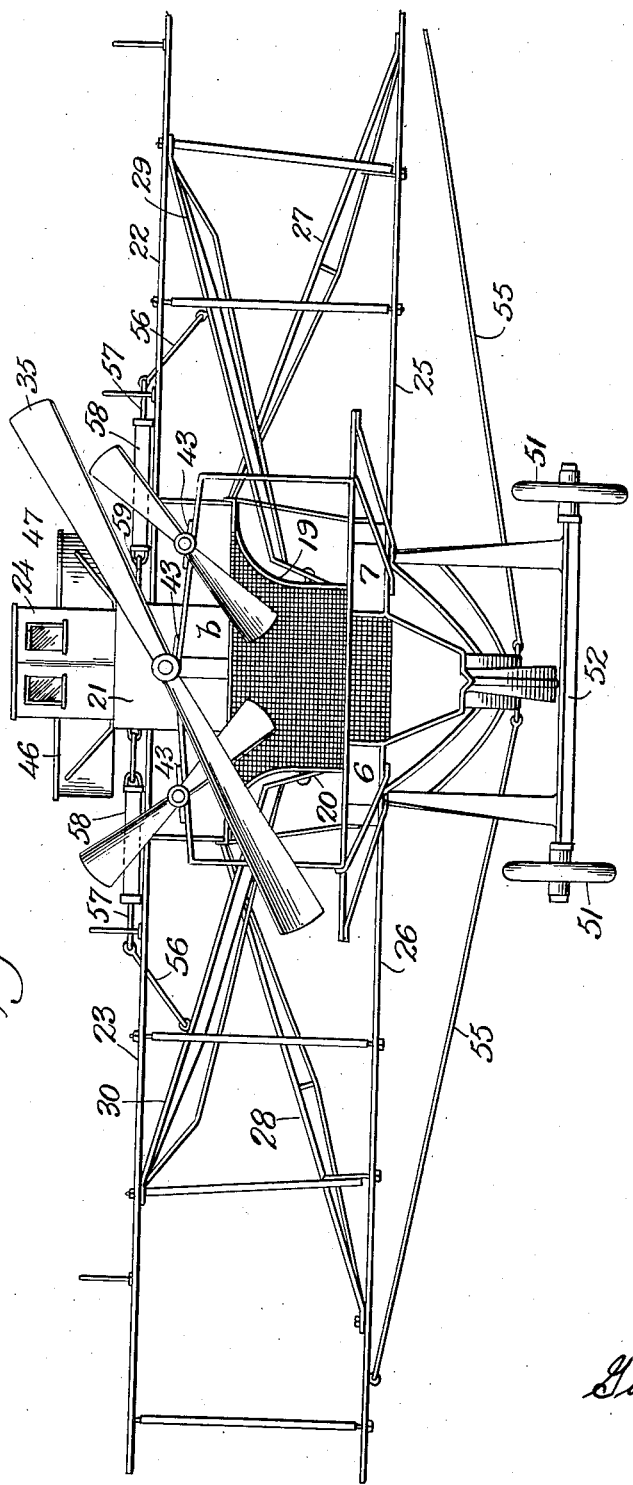
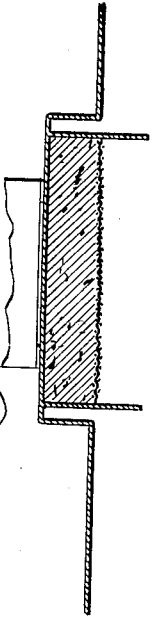
INVENTOR
Giuseppe Cannistra
BY
his ATTORNEY

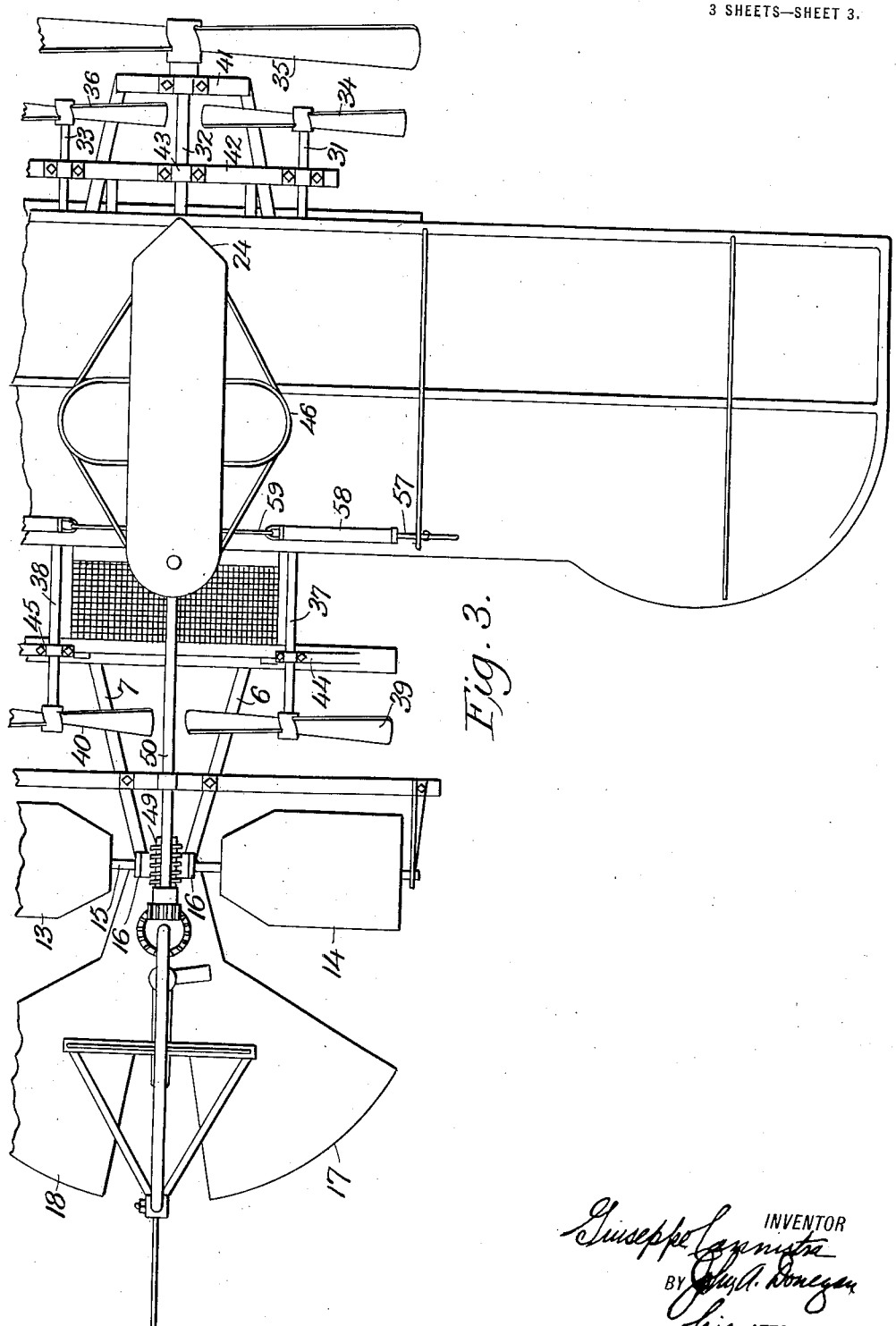

UNITED STATES PATENT OFFICE.

GIUSEPPE CANNISTRA, OF NEW YORK, N. Y.

HYDROAEROPLANE.

1,332,602.

Specification of Letters Patent.

Patented Mar. 2, 1920.

Application filed February 21, 1917. Serial No. 150,047.

*To all whom it may concern:*

Be it known that I, GIUSEPPE CANNISTRA, a citizen of the United States, residing at New York, county of Bronx, and State of New York, have invented certain new and useful Improvements in Hydroaeroplanes, of which the following is a specification.

The present invention relates to aeroplanes and has for its general object to provide an aeroplane with a body of relatively large carrying capacity and capable of supporting the planes or wings together with one or more operating motors and propellers. And to these ends the invention resides in a body constructed with a plurality of decks, and operating to support the wings or planes; and a chassis constructed so as to support the body.

Other objects will appear and be better understood from that embodiment of my invention of which the following is a specification, reference being had to the accompanying drawings forming part hereof, and in which:

Figure 1, is a side elevation of the invention.

Fig. 2, is a front elevation of the same.

Fig. 3, is a fragmentary plan view of the invention.

Fig. 4, is a longitudinal sectional detail of the bottom of the body.

Fig. 5, is a detail cross section of the bottom.

In the embodiment shown "*a*" indicates the chassis or hull which is preferably formed of metal throughout. As shown in Fig. 3 the forward and rear ends of the chassis are somewhat pointed while the intermediate portion is bulged so that the chassis as a whole conforms substantially in contour to the hull of a boat. This construction imparts to the chassis the property of offering a relatively slight resistance to the air in passing therethrough. As will be observed in the drawings the chassis is a skeleton like structure and comprises a keel 5 which slopes upwardly from substantially the intermediate portion, the rear or stern end of the keel being suitably connected to the converging rear ends of the side rails 6 and 7. The forward end of the keel is connected by a curved rib 9 to the forward end of the side rails, and at suitable intervals other ribs 8—8 are disposed so as to connect the side rails and keel together as shown. It will be observed that the ribs 8—8 are arch shaped and that the keel and side rails combine to form a structure substantially triangular in side elevation. In fact the chassis corresponds to a girder for supporting the parts subsequently to be described which girder is trussed and has all the advantages arising from the employment of the triangle and the arch when these are employed in a truss.

10 indicates the usual socket for the rudder post 11 at the rear end of chassis "*a*." It will be noted that the side rails 6 and 7 and the keel converge at the stern or rear end of the chassis and that the socket for the said rudder post is disposed in these converged portions so that a stable support is provided for the said rudder post. The rudder 12 is connected to post 11 and bearings 16—16 are provided for a transversely disposed shaft 15 which carries the ailerons 13 and 14. The tail planes 17 and 18 are of ordinary construction and are disposed on either side of the rudder 12 and secured to the side rails 6 and 7.

The body "*b*" has a built up structure formed of metal of relatively great height so as to include a lower deck 19, an intermediate deck 21 and a bridge deck 24. The body so constructed provides a suitable room or space in which passengers or material such as bombs, torpedoes and the like, may be placed for transportation. The side walls 20 of the deck curve outwardly through their length and form an arch support for the compartment 21 and the galleries on either side thereof which constitute the intermediate deck. These side walls by reason of their curvature also operate as auxiliary supporting plane surfaces for the machine when the same is in flight. Obviously a power plant of relatively large capacity must be employed for driving the machine of this invention at a velocity consistent with what will be required to sustain the machine in air when the same is loaded with passengers or other material.

For purposes of illustration I have shown five propellers three of which are disposed forwardly of the body and constitute tractors; the remaining two being disposed in the rear and operating as ordinary propellers. The shafts 31, 32 and 33 of the tractors 34, 35, and 36 may be suitably connected together by chain belts operated by a motor in the compartment of the intermediate deck and the shafts 37 and 38 of the propellers 39 and 40 may also be connected so as to be operated by the said motor, or separate motors may be employed for operating the tractors and the propellers, or still further a separate motor may be provided for each propeller and tractor, in which event the motors for the tractors 34 and 36 and propellers 39 and 40 may be conveniently located in the galleries on either side of the central compartment of the intermediate deck 21.

The upper and lower planes are formed of sections. The sections 25 and 26 of the lower plane are suitably connected at their inner ends to the side rails 6 and 7. And the sections 22 and 23 of the upper plane are disposed so that their inner ends abut the side walls of the central compartment of the intermediate deck 21. Truss girders of triangular construction and indicated by 27 and 28 are connected to the sections 25 and 26 of the lower plane and to the body "b" at a point in the region of the intermediate deck thereof so that these girders operate to brace the said sections of the lower plane and the body "b". Girders 29 and 30 similar to the girders 27 and 28 connect the sections 22 and 23 of the upper plane with the body "b" as shown, and function as described in connection with the girders 27 and 28. An intermediate bracing is provided for the girders 29 and 30, such means being herein shown as comprising truss buckles 58 connected at one end by swivels 59 to the side walls of the intermediate compartment of the upper deck and having their opposite ends connected by links 56 and 57 to the girders 29 and 30. In the present construction the links 56 are shown as being passed through the sections 22 and 23 of the upper plane.

A frame 41 is disposed upright at the forward end of the chassis, and another frame 42 disposed rearwardly of the frame 41 and adjacent to body "b" and provided with bearings 43—43 for the propeller shafts 31, 32 and 33 and uprights 44 and 45 disposed rearwardly of the body "b" are provided in their upper ends with bearings for the propeller shafts 37 and 38.

On the bridge deck 24 it will be noted that sponsons 46 are provided for accommodating machine guns and the like. The controlling devices (not shown) for the motor or motors may be conveniently located on this deck together with the means for operating the tiller shaft 50. Worm gearing 49 is employed for operating the ailerons 13 and 14 and the shaft 48 of this gearing has suitable connections (not shown) whereby it may be operated from the aforesaid bridge deck. The spur gear 50' meshes with a crown gear 50ª which is fixed to a bent rod 50ᵇ that is connected to the rudder 12 in any suitable way.

The machine thus far described is by preference formed of metal throughout. The height or depth of the lower and intermediate decks is such as will permit a person of ordinary height to stand erect in either. Access to the intermediate from the lower deck is had through a hatch (not shown) from which extends a flight of steps (not shown) and a similar construction may be provided for giving access from the intermediate to the bridge deck.

In the form shown in the drawings there is included in the chassis "a" a running gear consisting of the wheels 51 which are mounted on the axles 52 arranged on the lower ends of hangers 53 which depend from the side rails 6 and 7. It is proposed that the wheels 51 be detachably connected to the axles and these be adapted for connection to pontoons or other light bodies when occasion requires to convert the aeroplane into a hydro-aeroplane. The axles 52 and keel 5 are braced by the braces 54—54 and the sections 25 and 26 of the lower plane together with the keel 5 are braced by the rods 55—55.

It will be noted that by referring to Figs. 1, 4 and 5 that a compartment depends from the floor of the lower deck 19. In this compartment, which is indicated by 60, there are bodies 61 of an appreciable thickness. The said bodies may be of cork or other suitable material which may offer resistance to penetration by small bullets fired at the machine when the same is in the air.

From the foregoing it is obvious that the machine of this invention is ideal for military purposes in that ample space is provided for accommodating a number of persons and also for accommodating projectiles and explosives. The disposition of the body with respect to the supporting planes together with the disposition of the braces gives the required rigidity to the body and the planes to withstand the vibrations transmitted to the motors and propellers when these are in operation.

What is claimed as new is:

In an aeroplane, a chassis comprising a one-piece keel and side rails, said keel being positioned below and connected at its ends to the end portions of said side rails, a plurality of vertical supporting members disposed between said keel and side ribs, an upper and a lower deck thereon, a pair of wings and means for supporting the same from the decks.

In testimony whereof, I have signed my name to this specification this 20th day of February, 1917.

GIUSEPPE CANNISTRA.